United States Patent
Popovic'

(10) Patent No.: US 6,393,047 B1
(45) Date of Patent: *May 21, 2002

(54) QUADRIPHASE SPREADING CODES IN CODE DIVISION MULTIPLE ACCESS COMMUNICATIONS

(75) Inventor: Branislav M. Popovic', Solna (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,916

(22) Filed: Jun. 16, 1998

(51) Int. Cl.$^7$ .......................... H04B 15/00; H04K 1/00; H04L 27/30
(52) U.S. Cl. ..................... 375/140; 375/146; 370/342; 370/441
(58) Field of Search .................. 375/146, 140; 370/320, 335, 342, 441

(56) References Cited

U.S. PATENT DOCUMENTS

| | | | |
|---|---|---|---|
| 4,460,992 A | | 7/1984 | Gutleber |
| 4,529,963 A | | 7/1985 | Gutleber |
| 5,164,958 A | | 11/1992 | Omura |
| 5,598,154 A | | 1/1997 | Wilson et al. |
| 5,615,227 A | | 3/1997 | Schumacher et al. |
| 5,751,761 A | * | 5/1998 | Gilhousen .................. 375/200 |
| 5,778,022 A | | 7/1998 | Walley |
| 5,943,361 A | * | 8/1999 | Gilhousen et al. .......... 375/200 |
| 6,108,369 A | * | 8/2000 | Ovesjo et al. ............. 375/146 |

FOREIGN PATENT DOCUMENTS

| | | |
|---|---|---|
| WO | 94/16513 | 7/1994 |
| WO | 95/03652 A | 2/1995 |
| WO | 95/22210 | 8/1995 |

OTHER PUBLICATIONS

*IEEE Transactions on Information Theory*, vol. 42, No. 2, Mar. 1996, pp. 579–592, XPOO2101094, USA, P.V. Kumar et al., "Large Families of Quaternary Sequences With Low Correlation".

(List continued on next page.)

*Primary Examiner*—Tesfaldet Bocure
*Assistant Examiner*—Phuong Phu
(74) *Attorney, Agent, or Firm*—Nixon & Vanderhye P.C.

(57) ABSTRACT

Optimal code sequences are generated for use in spreading and de-spreading functions in a code division multiple access (CDMA) communications system. In particular, a family of quadriphase spreading codes is employed that provides a maximal number of spreading codes to achieve a high capacity in the CDMA communications system while at the same time having a minimal peak cross-correlation between any two spreading codes within that family to ensure cross-correlation interference is kept at or below acceptable levels. That optimal quadriphase spreading code family is the S(2) family of four phase code sequences of length $L=2^{m-1}$, where m is an integer greater than or equal to 5. The size of the S(2) family of quaternary spreading codes is $(L+2)(L+1)^2$, and the maximum cross-correlation is $1+4\sqrt{(L+1)}$. The spreading codes are preferably allocated to base stations using specific code subsets of the S(2) family having the same cross-correlation properties of the S(0) and/or S(1) family of codes. Spreading codes are advantageously extended by one or more code symbols as necessary or otherwise desirable. For example, to support variable transmission rate services, it is desirable to employ spreading codes whose length may be expressed as an integer multiple of each spreading factor in the mobile communications system. Since individual spreading codes have a length of $2^m-1$, one code symbol is added to the generated spreading code.

59 Claims, 8 Drawing Sheets

OTHER PUBLICATIONS

*Proceedings of the International Symposium on Information Theory,* Institute of Electrical and Electronics Engineers, Trondheim, Jun. 27–Jul. 1, 1994, Jun. 27, 1994, p. 71, XP000199052, P.V. Kumar et al., "Large Families of Quaternary Sequences with Low Correlation".

*IEICE Transactions on Communications,* vol. E76–B, No. 8, Aug. 1, 1993, pp. 804–813, XP000396882, A.R. Hammons et al., "On a Recent 4–Phase Sequence Design for CDMA".

*IEEE Transactions on Information Theory,* vol. 39, No. 3, May 1, 1993, pp. 1083–0185, XP000383047, T. Novosad, "A New Family of Quadriphase Sequences for CDMA".

*European Transactions on Telecommunications,* vol. 7, No. 3, May 1, 1996, pp. 235–238, XP000592673, H.D. Lueke, "Large Families of Polynominal Phase Sequences With Low Correlation".

Proceedings of the IEEE, vol. 68, No. 5, May 1980, pp. 593–619, Dilip V. Sarwate et al., "Crosscorrelation Properties of Pseudorandom and Related Sequences".

AAECC 5, 123–128, (1994), Hannu Tarnanen et al., "A Simple Method to Estimate the Maximum Nontrivial Correlation of Some Sets of Sequences".

IEE Proc.—Commun., vol. 144, No. 6, Dec. 1997, pp. 361–366, P.Z. Fan et al., "Construction and comparison of periodic digital sequence sets".

IEEE Transactions on Information Theory, vol. 38, No. 3, May 1992, pp. 1101–1113, Serdar Boztas et al., "4–Phase Sequences with Near–Optimum Correlation Properties".

IEEE Transaction on Information Theory, vol. 42, No. 2, Mar. 1996, pp. 579–592, P. Vijay Kumar et al., "Large Families of Quaternary Sequences with Low Correlation".

IEICE Trans. Commun., vol. E76–B, No. 8, Aug. 1993, pp. 804–813, A. Roger Harmons, Jr. et al., "On a Recent 4–Phase Sequence Design for CDMA".

* cited by examiner

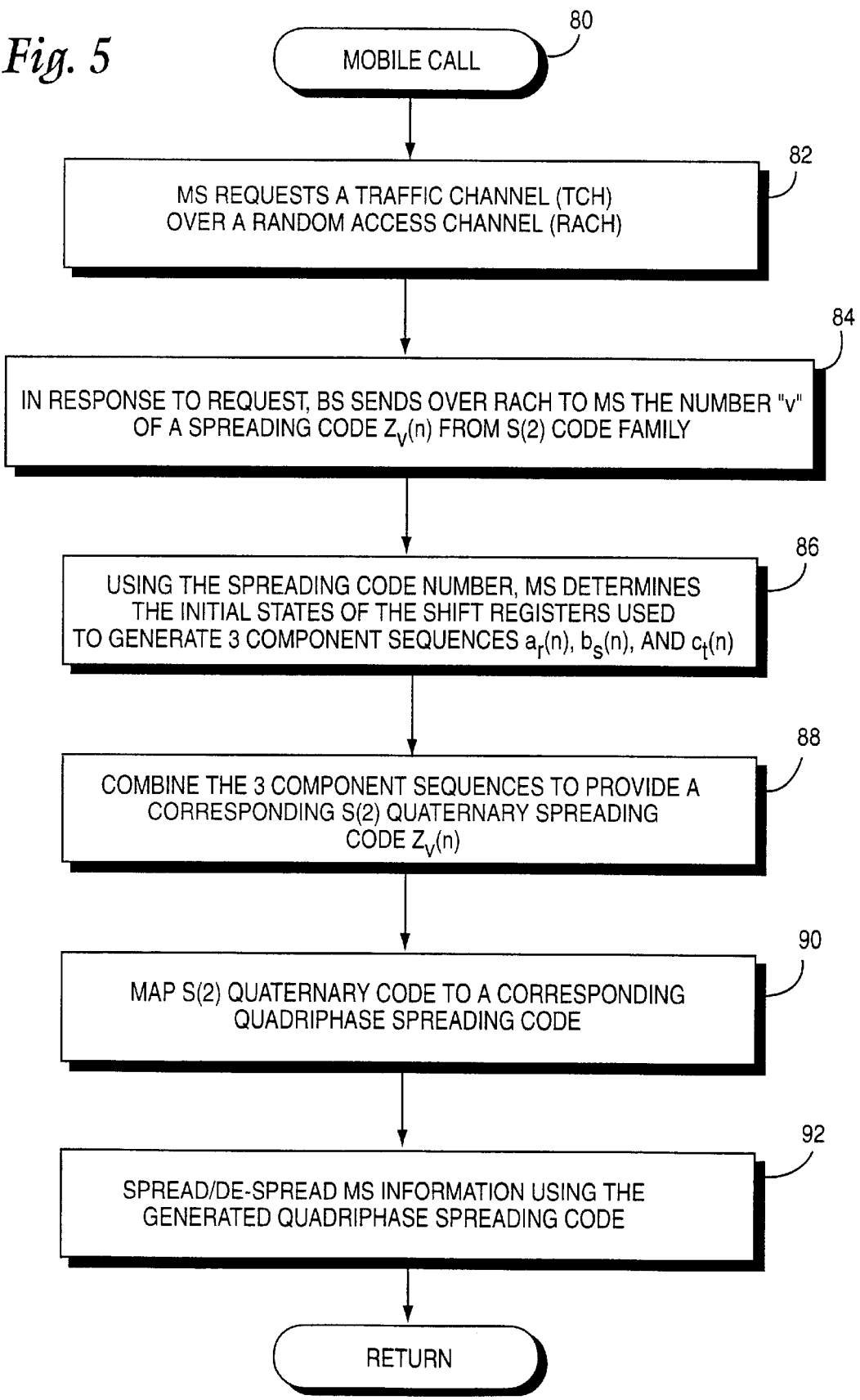

001

QUADRIPHASE SPREADING CODES IN CODE DIVISION MULTIPLE ACCESS COMMUNICATIONS

FIELD THE INVENTION

The present invention relates to spread spectrum communications, and more particularly, to the generation of optimal code sequences used to perform spreading and de-spreading functions in a code division multiple access communication.

BACKGROUND AND SUMMARY OF THE INVENTION

A direct sequence spread spectrum (DSSS) system is a wide-band system in which the entire frequency bandwidth of the system is available to each user all the time. A DSSS system employs a spreading signal that expands or "spreads" the bandwidth of the transmitted signal much more than it is required for the transmission of information symbols. The spreading signal is usually called a spreading or scrambling code or sequence. The term spreading code is generally adopted for this description. Different users in a DSSS system are distinguished using the different spreading codes. This is why DSSS systems are also referred to as Direct Sequence—Code Division Multiple Access (DS-CDMA) systems. In general, spreading codes are usually bi-phase, with elements belonging to the set $\{+1,-1\}$, or polyphase, with elements belonging to the set of complex numbers corresponding to equidistant points on the unit circle in the complex plane. For example, quadriphase corresponds to four points of unit length from the origin.

In general, there is a trade-off between increasing the number of spreading codes and decreasing interference. The number of spreading codes used to distinguish mobile station users, particularly on the uplink direction from a mobile station to a base station, should be as large as possible. This is because more spreading codes provide more radio channels so that more mobile stations can communicate at the same time in the same geographic area. But increasing capacity in a CDMA system comes at a cost—interference which reduces the quality of communication for all users. However, it is desirable that the amount of correlation between any two of the spreading codes be reduced to minimize the interference between the mobile stations communicating using those codes. More formally, the maximum, periodic, cross-correlation between any two spreading codes should be as low as possible.

The periodic cross-correlation, also called even correlation, is equal to a correlation output under the assumption that the data modulation format does not change during the correlation operation. In practice, successive data modulation symbols have random rather than periodic values. Therefore, an odd correlation function better represents the correlation output when a data symbol of interfering signal changes during the correlation operation. While both the even and odd correlation functions should be evaluated to obtain an interference measure for any two spreading codes assigned to a pair of mobile stations to determine the degree of cross-correlation, odd cross-correlation is difficult to determine theoretically for a given set of spreading codes. Therefore, the even correlation function is used to compare different families or sets of spreading codes to determine an optimal family/set.

The present invention provides an optimal set of spreading codes for use for example in a wideband-CDMA (WCDMA) mobile radio communications system. Although this set of spreading codes may be employed in synchronized, downlink transmissions from the base station, it is particularly useful in the uplink direction from the mobile station to the base station where the different mobile stations are not mutually synchronized. The optimal spreading code family provides a large number of codes that also have low cross-correlation between spreading codes for all possible time shifts between the different mobile stations. In this way, the mobile communications system capacity is significantly increased while still providing satisfactory radio communications with minimum interference to/from the other mobile stations.

In a preferred embodiment, the optimal code family is the S(2) family of four-phase code sequences of length $L=2^m-1$, where m is an integer greater than or equal to 5. The codes in the S(2) family are generated by summing modulo-4 three component sequences including a first component quaternary sequence a(n), a second component binary sequence b(n), and a third component binary sequence c(n), where the binary sequences b(n) and c(n) are multiplied by two before summing. The size of the family, i.e., the number of quaternary spreading codes, is $(L+2)(L+1)^2$, and the maximum cross-correlation between any two of the codes is $1+4\sqrt{(L+1)}$. The three component sequences may be generated using corresponding linear feedback shift-register generators. The set of $(L+2)(L+1)^2$ different S(2) sequences is obtained by combining the different component sequences produced by the different initial shift register states: (L+2) initial states for an a(n) sequence and (L+1) initial states for b(n) and for c(n) sequences.

As an example, the number of S(2) spreading codes having a length (L) of 255 chips is 16,842,752 with a maximum, absolute, even cross-correlation of 65. Over 16 million uplink spreading codes provides considerable system capacity. If one assumes that no more that 256 mobile stations will be served in a single base station sector, then 65,792 code sets may be re-used in the mobile communications system. This large number of code sets provides considerable flexibility in network planning.

Although spreading codes from the S(2) family may be randomly selected and allocated to various users in a CDMA mobile communications system, a preferred example embodiment of the present invention allocates the spreading codes in accordance with a specific code allocation procedure that achieves more advantageous results compared with random code selection. Assuming the entire mobile communications system employs the S(2) family of codes, specific spreading code subsets of the S(2) family of codes are allocated to each base station (or base station sector). The spreading code subsets have the same cross correlation properties of the S(0) and/or S(1) families of codes and provide reduced interference for mobile stations operating in the same base station (or same base station sector) as compared to randomly selected codes from the S(2) family of codes.

Capacity is one important aspect of a communications system, but services are also very important. There are certain services provided in mobile communications systems like WCDMA cellular systems that may require or support more than one data rate. For variable rate and other services, it is desirable to provide spreading codes whose length may be expressed as an integer multiple of each spreading factor in the mobile communications system. The spreading factor corresponds to the number of chips used to spread a single data symbol. Relatively short spreading codes, whose code period covers one or more data symbols, are desirable in order to support low-complexity, multi-user detection at the CDMA radio base stations.

One way of implementing multiple data rates is to use those data rates which allow corresponding spreading factors (SF) to be expressed as $SF(k)=L/2^k$, where L is the length of each spreading codes in the code family and k is a positive integer and varies in proportion to the data rate. Therefore, the spreading code length should be some power of two. Having the spreading code length expressible as an integer multiple of each possible spreading factor in the system significantly alleviates overall synchronization in the receiver making it independent of the data rate. In other words, if the spreading code period contains an integer number of data symbols, data frame and data synchronization in the receiver are derived automatically when the receiver despreading sequence is synchronized with the incoming signal. Otherwise, the data symbol position with respect to the (relatively small) spreading code period fluctuates over the time, i.e., it is different in consecutive spreading code periods. As a result, it is difficult to attach a single data synchronization signal to a spreading code period, and consequently, a separate circuit in addition to a code synchronization circuit must be employed to acquire and track data synchronization.

However, the length (L) of the codes in typical spreading code families is $2^m-1$, like the S(2) spreading code family described above. For example, if m=8, the code length is 255. In order to obtain the advantages of optimal high capacity at minimal cross-correlation code interference as well as support the variable data rate applications, the present invention extends the length of each spreading code by a code symbol to make the spreading code length a power of 2. In a preferred example embodiment, an additional code symbol is added to the end of each spreading code. More specifically, the extended spreading code is obtained by adding another code symbol after L symbols of the original (non-extended) code of length L.

In one example embodiment, the added code symbol may be fixed, i.e., have the same value, for all spreading codes in the family. In other example embodiments, the added code symbol has the same value as the first chip in the original spreading code. In the case of quaternary spreading codes like those in the S(2) family, the additional spreading code symbol may have four possible values, i.e., 0, 1, 2, or 3. Preferably, the value of the additional spreading code symbol is selected to optimize the mutual cross-correlation between the extended spreading codes.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

FIG. 5 is a flowchart diagram illustrating example procedures for providing a spreading code from an optimal S(2) spreading code family in accordance with the present invention;

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, while the present invention is sometimes described in the context of a mobile radio station using uplink spreading codes, the present invention is equally applicable to other radio stations, e.g., radio base stations, and indeed, to any spread spectrum communications system. In other instances, detailed descriptions of well-known methods, interfaces, devices, and signaling techniques are omitted so as not to obscure the description of the present invention with unnecessary detail.

Figure 1:
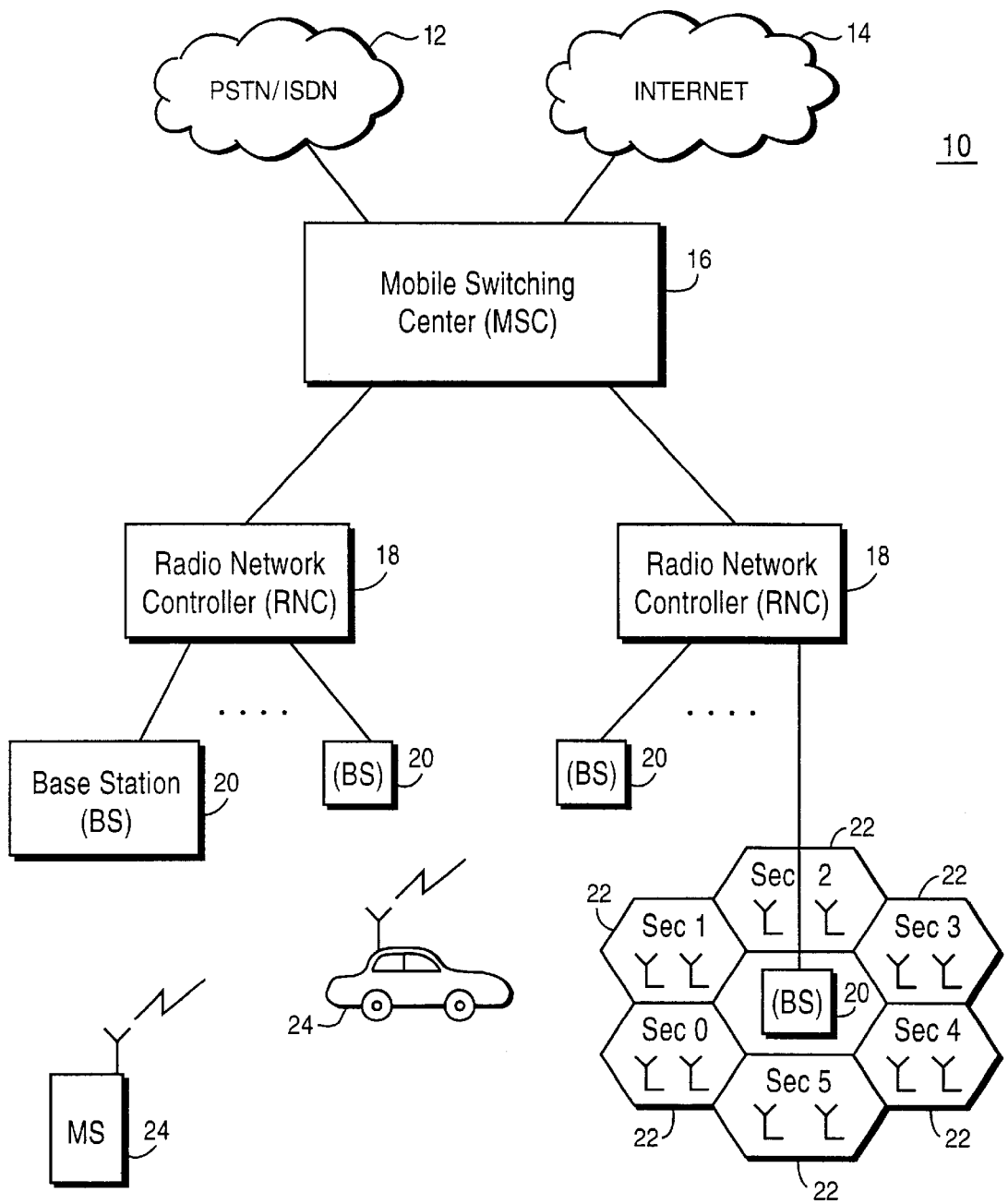
FIG. 1 is a function block diagram of an example mobile communications system in which the present invention may be advantageously employed.
Figure 2:
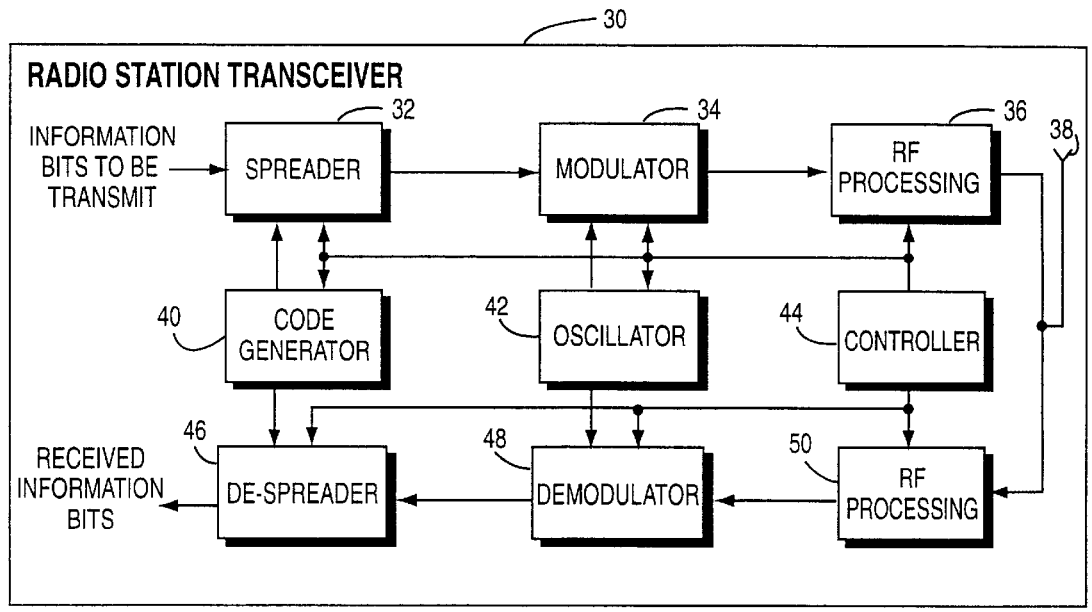
FIG. 2 is a function block diagram of an example radio station transceiver in which the present invention may be advantageously employed.

The present invention is described in the context of a universal mobile telecommunications system (UMTS) 10 shown in FIG. 2. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface A'. The Internet connectionless-oriented network 14 is connected to a General Packet Radio Service (GPRS) node 20 tailored to provide packet-switched type services. Each of the core network service nodes 18 and 20 connects to a UMTS Radio Access Network (URAN) 24 over a radio access network (RAN) interface. URAN 24 includes one or more radio network controllers 26. Each RNC 26 is connected to a plurality of base stations (BS) 28 and to any other RNC's in the URAN 24.

In the preferred embodiment, radio access is based Upon wideband, Code Division Multiple Access (WCDMA) with individual radio channels allocated using CDMA spreading codes. WCDMA provides wide bandwidth for multimedia services and other high rate demands as well as robust features like diversity handoff and RAKE receivers to ensure high quality. Each mobile station 24 is assigned its own spreading code in order for a base station 20 to identify transmissions from that particular mobile station as well as for the mobile station to identify transmissions from the base station intended for that mobile station from all of the other transmissions and noise present in the same area.

A CDMA radio station transceiver 30 in which the present invention may be employed is shown in FIG. 2 in function block format. Those skilled in the art will appreciate that other radio transceiver functions used in CDMA transceivers not particularly relevant to the present invention are not shown. In the transmit branch, information bits to be transmit are received by a spreader 32 which spreads those information bits over the available frequency spectrum, (for wideband CDMA this frequency band could be for example 5 MHz, 10 MHz, 15 MHz or more), in accordance with a spreading code generated by a spreading code generator 40. Controller 44 determines which spreading code should be provided by code generator 40 to spreader 32. The spreading code provided by code generator 40 corresponds to a radio channel in a CDMA communications system. Because a very large number of code symbols (sometimes called "chips") may be used to code each information bit, (depending on the current data rate in a variable data rate system such as a WCDMA system), the spreading operation considerably increases the data rate thereby expanding the signal bandwidth. The spread signal is provided to a modulator 34 which modulates the spread signal onto an RF carrier. An oscillator 42 generates an appropriate radio frequency carrier at a frequency selected by the controller 44. The modulated RF signal is then filtered and amplified in RF processing block 36 before being transmitted over the radio interface by way of antenna 38.

Similar but reverse operations are carried out in the receive branch of the transceiver 30. An RF signal is received by antenna 38 and filtered in RF processing block 150. The processed signal is then demodulated to extract the baseband signal from the RF carrier in a demodulator 48 using a suitable RF carrier signal provided by the oscillator 44. The demodulated signal is de-spread in a de-spreader 46 in accordance with a code selected by the controller 44 and generated by the code generator 40. The de-spread signal corresponds to the received information bits at baseband which are then typically further processed. While individual functional blocks are shown in the radio station transceiver 30, those skilled in the art will appreciate that these functions may be performed by individual hardware circuits, by a suitably programmed digital microprocessor, by an application specific integrated circuit (ASIC), and/or by one or more digital signaling processors (DSPs).

Figure 3:
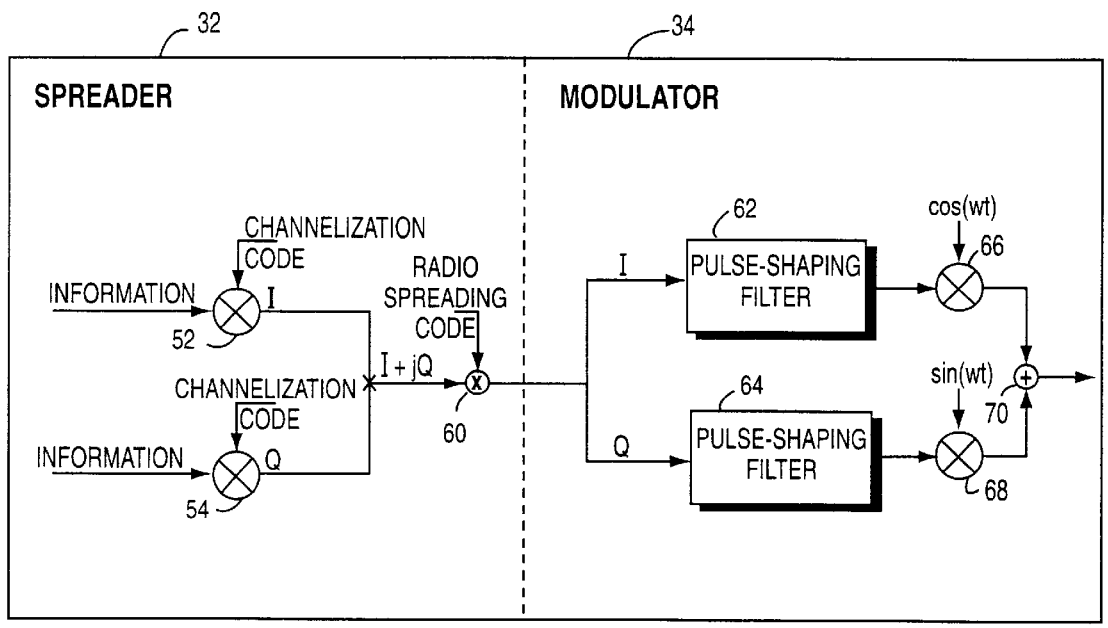
FIG. 3 is a function block diagram illustrating additional details of the spreader and modulator blocks shown in FIG. 2.
Figure 4:
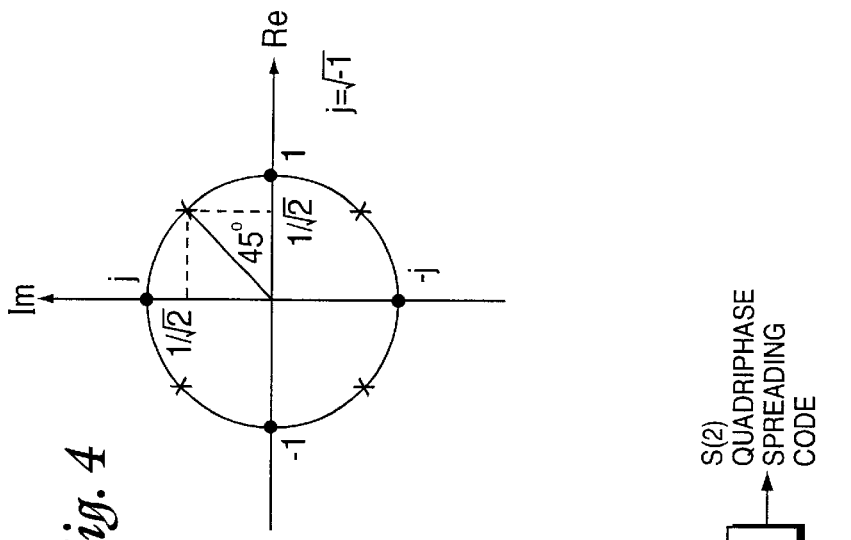
FIG. 4 illustrates a unit circle diagram illustrating four quadriphase values in a complex plane.

FIG. 3 illustrates in schematic form further example details of the spreader 32 and the modulator 34. A similar schematic would apply to the demodulator 48 and the de-spreader 46 with opposite functions in the reverse direction. Quadrature phase shift keying (QPSK) is used both for the data modulation (performed by spreader 32), and the spreading modulation (performed by quadrature modulator 34). FIG. 4 illustrates four quadriphase points in the unit circle corresponding to the complex plane defined by a real axis I and an imaginary axis Q. The four quadriphase alphabet values correspond to $$\left\{ e^{j\frac{\pi}{4}},\ e^{j\frac{3\pi}{4}},\ e^{-j\frac{3\pi}{4}},\ \text{and}\ e^{-j\frac{\pi}{4}} \right\},$$

where $j=\sqrt{-1}$.

The example spreader 32 in FIG. 3 includes two biphase (+/−1) information streams to be demodulated separately, such as a traffic data stream and a control data stream, which are input to respective multipliers 52 and 54 in order to be spread and IQ multiplexed. The traffic and control data streams are spread by different channelization codes and then mapped to the I and Q branches. Channelization codes are employed to separately identify and distinguish the real and imaginary information streams at the receiver, even if there is imperfect I and Q phase synchronization at the receiver. In the situation where plural traffic and control data streams are to be transmit in parallel from a single mobile user, (e.g., multicode transmissions—intended for very high data rates), plural orthogonal channelization codes are used to make the necessary parallel code channels. The channelization codes can be based on so-called Orthogonal Variable Spreading Factor (OVSF) codes which maintain orthogonality even if different spreading factors are used. The channelization codes are common for all mobile stations.

The I and Q information streams represent the real and imaginary parts of a complex data stream to be transmit over a CDMA radio channel. In the present description, separate real and imaginary information streams and corresponding different channelization codes have been employed to generate a complex signal to be spread using a corresponding radio CDMA spreading code. However, the signal need not be complex. Indeed, the present invention may be employed to spread any type of information signal.

The spreading code generated by spreading code generator 40 is employed by the complex multiplier 60 to spread the complex information signal. The complex multiplier 60 in a QPSK data modulator performs complex multiplication between the complex data stream I+jQ and a complex spreading code (e.g., temporarily allocated to a mobile station) to provide the spread signal output to the modulator 34. Quadrature modulator 34 splits the spread signal into real (I) and imaginary (Q) streams which are processed by a corresponding pulse shaping filter 62, 64, such as a root-raised cosine filter, and then provided to respective mixers 66 and 68 which also receive in-phase and quadrature versions of the RF carrier. The modulated carrier quadrature signals are summed in summer 70 and output to the RF processing block 36.

As mentioned above, the number of CDMA spreading codes used to distinguish mobile station users, particularly on the uplink direction from a mobile station to a base station should be as large as possible to allow more mobile stations to communicate at the same time in the same geographic area. On the other hand, the number of spreading codes cannot be too large; otherwise, there is too much interference generated among mobile stations to have an acceptable communication. The present invention provides a set of spreading codes with an optimal balance: a relatively large number of spreading codes with only minimal periodic cross-correlation between any two of the spreading codes in the family.

For comparison, parameters of various bi-phase and quadriphase spreading code families are shown in Table I below. The alphabet size corresponds to the number of different values that each code symbol may assume. For bi-phase codes, the alphabet size is two; for quadriphase codes the alphabet size is four. The sequence length (L) is the number of code symbols ("chips") in each code and for all code families in the Table I is equal to $2^m-1$, where m is a positive integer whose possible values may be restricted depending on how the particular code family is constructed. The family size (M) is the number of codes in a particular spreading code family. The larger the family size M, the greater the capacity. The maximum absolute cross-correlation ($C_{max}$) is the maximum, periodic, cross-correlation between any two spreading codes in the spreading code family.

TABLE I

| Spreading Code Family | Alphabet Size (p) | Sequence Length (L) | Length Restriction | Family Size (M) | Max. Abs. Cross-Corr. ($C_{max}$) |
|---|---|---|---|---|---|
| Gold | 2 | $2^m-1$ | m = 1 mod 2 | L + 2 | $1 + \sqrt{2\sqrt{L+1}}$ |
| Gold | 2 | $2^m-1$ | m = 2 mod 4 | L + 2 | $1 + 2\sqrt{L+1}$ |
| Gold-like | 2 | $2^m-1$ | m = 0 mod 4 | L + 1 | $1 + 2\sqrt{L+1}$ |
| Reciprocal Gold-like | 2 | $2^m-1$ | m = 0 mod 2 | L + 2 | $2\sqrt{L+1} - 1$ |
| Small Kasami | 2 | $2^m-1$ | m = 0 mod 2 | $\sqrt{L+1}$ | $1 + \sqrt{L+1}$ |
| Large Kasami | 2 | $2^m-1$ | m = 2 mod 4 | $(L + 2)\sqrt{L+1}$ | $1 + 2\sqrt{L+1}$ |
| Large Kasami | 2 | $2^m-1$ | m = 0 mod 4 | $(L + 2)\sqrt{L+1} - 1$ | $1 + 2\sqrt{L+1}$ |
| Very Large Kasami | 2 | $2^m-1$ | m = 0 mod 2 | $(L + 2)^2\sqrt{L+1}$ | $1 + 4\sqrt{L+1}$ |
| Very Large Kasami | 4 | $2^m-1$ | m = 0 mod 2 | $(L + 2)^2\sqrt{L+1}$ | $\sqrt{2}(1 + 4\sqrt{L+1})$ |
| Family s(0) | 4 | $2^m-1$ | None | L + 2 | $1 + \sqrt{L+1}$ |
| Family s(1) | 4 | $2^m-1$ | m ≥ 3 | (L + 2)(L + 1) | $1 + 2\sqrt{L+1}$ |
| Family s(2) | 4 | $2^m-1$ | m ≥ 5 | $(L + 2)(L + 1)^2$ | $1 + 4\sqrt{L+1}$ |

Based on this analysis of various characteristics of these code families, the inventor determined that the S(2) family of spreading codes offers the optimal compromise between the largest number (M) of spreading codes, $(L+2)(L+1)^2$, and the smallest cross-correlation, $1+4\sqrt{L+1}$. In other words, for the S(2) spreading codes, the ratio of the number of spreading codes to the cross-correlation peak is maximized for a given spreading code length L. The S(1) and S(2) spreading code families are obtained by generalizing from the construction of the S(0) family of quadriphase spreading codes. The S(2) spreading code family includes the S(1) family, which is the subset of (L+2)(L+1) spreading codes obtained by combining different a(n) and b(n) component sequences. The S(2) and S(1) spreading code families include the S(0) family, which is the subset of (L+2) spreading codes obtained by different initial states of an a(n) component sequence shift-register. The S(0) spreading code family has the same number of spreading codes as the Gold spreading code family, but the S(0) family has a smaller cross-correlation at least by factor of $j=\sqrt{2}$.

In order to provide a better understanding of the present invention, construction of the S(2) family of spreading codes is now described. Let $h(x)=x^m+h_1x^{m-1}+ \ldots +h_{m-1}x+h$, where $h_k$, $x \in Z_4$, be a primitive polynomial over $Z_4$ of degree m, where $Z_4$ is the set of integers {0,1,2,3}, i.e., the ring of modulo-4 integers. A list of all the primitive polynomials over $Z_4$ up to degree m=15 can be found in "On a Recent 4-Phase Sequence Design for CDMA," Hammons et al., IEICE Trans. Commun., vol. E76-B, no. 8, pp. 804–813. The $m^{th}$-order linear recurrence $a_r(n)$ over $Z_4$, defined by h(x) as $$a_r(n)=h_1a(n-1)-h_2a(n-2)- \ldots -h_ma(n-m) \text{ (mod 4)}, n \geq m, \quad (1)$$

produces a quaternary sequence of period $L=2^m-1$. The above recurrence may be implemented using a shift register with feedback connections.

There are L+2 cyclically distinct sequences which can be obtained from the recurrence defined in equation (1) by choosing an appropriate initial state of the recurrence, i.e., of the shift register. The initial state $\tau_r$ is a vector of m elements, which can be represented as $$\tau_r=[a_r(m-1), a_r(m-2), \ldots a_r(0)].$$

The L+2 initial states $\tau_0, \tau_1, \tau_2, \ldots \tau_{L+1}$ can be chosen according to the following algorithm $$\tau_r=[T(\gamma_r x^{m-1}), T(\gamma_r x^{m-2}), \ldots, T(\gamma_r x), T(\gamma_r)], \quad (2)$$

where $$T(\xi)=[\xi+\xi^2+\xi^4+ \ldots +\xi^{2^{m-1}}(\text{mod } h(x), \text{ mod } 4)](\text{mod } x), \quad (3)$$

and $$\gamma_0=1, \gamma_1=2, \gamma_2=3,$$

$$\gamma_3=1-x, \gamma_4=1-x^2, \ldots, \gamma_{L+1}=1-x^{L-1}, (\text{mod } h(x), \text{ mod } 4) \quad (4)$$

The set of sequences $\{a_r(n)\}$ defined by equations (1)–(4) represents the S(0) family of sequences whose parameters are given in Table I.

The set of sequences $\{a_r(n)\}$ of length 255 can be generated by a degree 8 primitive polynomial over $Z_4$. The primitive polynomial of degree 8, which provides the simplest feedback connections of the corresponding shift-register generator, is as follows:

$$h(x)=x^8+x^5+3x^3+x^2+2x+1. \quad (5)$$

The S(1) family of sequences $\{y_u(n)\}$, u=0,1, ..., (L+2)(L+1)-1, is the generalization of the S(0) sequence family obtained by combining the quaternary sequences from the set $\{a_r(n)\}$, r=0,1,2, ..., (L+1), with the binary sequences $\{b_s(n)\}$, s=0,1,2, ..., L, of the same length. The exact algorithm is given by the following relation:

$$y_u(n)=a_r(n)+2b_s(n) \text{ (mod 4)}, n=0,1, \ldots, L-1 \ldots \quad (6)$$

The sequences $b_s(n)$ are obtained by a linear recurrence over $Z_2$, defined by the polynomial $g(x)=x^e+g_1x^{e-1}+ \ldots +g_{e-1}x+1$ as $$b_s(n)=g_1b(n-1)+g_2b(n-2)+ \ldots +b(n-e) \text{ (mod 2)}, n \geq e, \quad (7)$$

where $e \leq m$ is a minimum integer satisfying $(3 \cdot 2^e)$ mod $(2^m-1)=3$.

The polynomial g(x) is related to the polynomial h(x) and is obtained from the polynomial g(x)', given by $$g(x)' = \quad (8)$$
$$(x-x^3)(x-(x^3)^2)(x-(x^3)^{2^2}) \ldots (x-(x^3)^{2^{e-1}})(\text{mod } h(x), \text{mod} 2),$$

according to the following relation $$g(x) = \begin{cases} g(x)' & e < m \\ [h(x) + g(x)'] \bmod 2, & e = m \end{cases} \quad (9)$$

For h(x) given by equation (5), the corresponding g(x) is equal to $$g(x) = x^8 + x^7 + x^5 + x + 1. \quad (10)$$

The set of L+1 distinct (but not cyclically distinct) sequences $b_s(n)$ is defined by the appropriate initial states of the recurrence defined in equation (7). The L+1 initial states $\delta_0, \delta_1, \delta_2, \ldots \delta_L$ are defined as $$\delta_0 = 0, \delta_1 = 1,$$

$$\delta_2 = x, \delta_3 = x^2, \ldots, \delta_L = x^{L-1}, \text{ (mod } h(x), \bmod 2). \quad (11)$$

The actual initial state $[b_s(m-1), b_s(m-2), \ldots, b_s(0)]$ is given by the coefficients of corresponding polynomial $\delta_s$ defined by equation (11) according to the following notation:

$$\delta_s = b_s(m-1)x^{m-1} + b_s(m-2)x^{m-2} + \ldots + b_s(0)$$

The S(2) family of sequences $\{z_v(n)\}$, $v = 0, 1, 2, \ldots (L+1)(L+1)^2-1$, is a further generalization using the S(0) and S(1) families. It is obtained by combining the sequences from the previously defined sets $\{a_r(n)\}$ and $\{b_s(n)\}$ with an additional set $\{c_t(n)\}$ of L+1 binary sequences, according to the following relation:

$$z_v(n) = a_r(n) + 2b_s(n) + 2c_t(n) \text{ (mod 4), } n = 0, 1, \ldots, L-1. \quad (12)$$

An enumeration algorithm for the set S(2) can be defined by $$v = r \cdot 2^{(L+1)(L+1)} + s \cdot 2^{L+1} + t$$

$$r = 0, 1, 2, \ldots, L+1$$

$$s = 0, 1, 2, \ldots, L$$

$$t = 0, 1, 2, \ldots, L \quad (13)$$

The sequences $c_t(n)$ are obtained by a linear recurrence over $Z_2$, defined by the polynomial $f(x) = x^e + f_1 x^{e-1} + \ldots + f_{e-1} x + 1$ as $$c_t(n) = f_1 c_t(n-1) + f_2 c_t(n-2) + \ldots + c_t(n-e) \text{ (mod 2), } n \geq e, \quad (14)$$

where $e \leq m$ is a minimum integer satisfying $(5 \cdot 2^6) \bmod (2^m - 1) = 5$. The polynomial f(x) is related to the polynomial h(x) and is obtained from the polynomial f(x)', given by $$f(x)' = \quad (15)$$

$$(x - x^5)(x - (x^5)^2)(x - (x^5)^{2^2}) \ldots (x - (x^5)^{2^{e-1}}) (\bmod h(x), \bmod 2),$$

according to the following relation $$f(x) = \begin{cases} f(x)' & e < m \\ [h(x) + f(x)'] \bmod 2 & e = m \end{cases} \quad (16)$$

For h(x) given by equation (5), the corresponding f(x) is equal to $$f(x) = x^8 + x^7 + x^5 + x^4 + 1. \quad (17)$$

The set of L+1 distinct (but not cyclically distinct) sequences $c_t(n)$ is defined by the appropriate initial states of the recurrence (14). These initial states are already defined by equation (11).

The above constructions for the S(2) spreading code family produce quaternary codes with elements belonging to the set $\{0, 1, 2, 3\}$. To obtain complex quadriphase spreading codes having a constant envelope, with real and imaginary parts being bi-phase $$\pm \frac{1}{\sqrt{2}}$$

values, i.e., with elements belonging to the set $$\{e^{j\frac{\pi}{4}}, e^{j3\frac{\pi}{4}}, e^{-j3\frac{\pi}{4}}, e^{-j\frac{\pi}{4}}\},$$

the following transformation is applied $$s2(n) = e^{j\frac{\pi}{4}} \cdot e^{j\frac{\pi}{2} \cdot x(n)} \quad (18)$$

With this mathematical explanation of how the S(2) family of spreading codes is constructed, reference is now made to a Mobile Call routine (block 80) illustrated in function block format in FIG. 5. Initially, a mobile station requests a traffic channel (TCH) by sending a traffic channel request over a random access channel (RACH) (block 82). The random access channel has one or more corresponding spreading codes which the mobile station employs to transceive over that random access channel. In response to the mobile's request, the base station sends over the random access channel to the mobile station the number "v" of a spreading code $z_v(n)$ from the S(2) spreading code family (block 84) corresponding to an allocated radio channel. $Z_v(n)$ is defined in equation (12), and v is defined in equation (13) above. Using the spreading code number v, the mobile station determines the ordinal numbers r, s, and t which uniquely identify the initial states of shift registers used to generate the three component sequences $a_r(n)$, $b_s(n)$, and $c_t(t)$ defined above in equations (1), (7) and (14), respectively. Those three component sequences are combined to provide a corresponding S(2) quaternary spreading code $z_v(n)$ in accordance with equation (12) (block 88). The S(2) quaternary spreading code is then mapped to a corresponding quadriphase spreading code (block 90) and used to spread/de-spread (depending upon transmit or receive operation currently being performed in the mobile station) information using the generated quadriphase spreading code (block 92).

Figure 6:
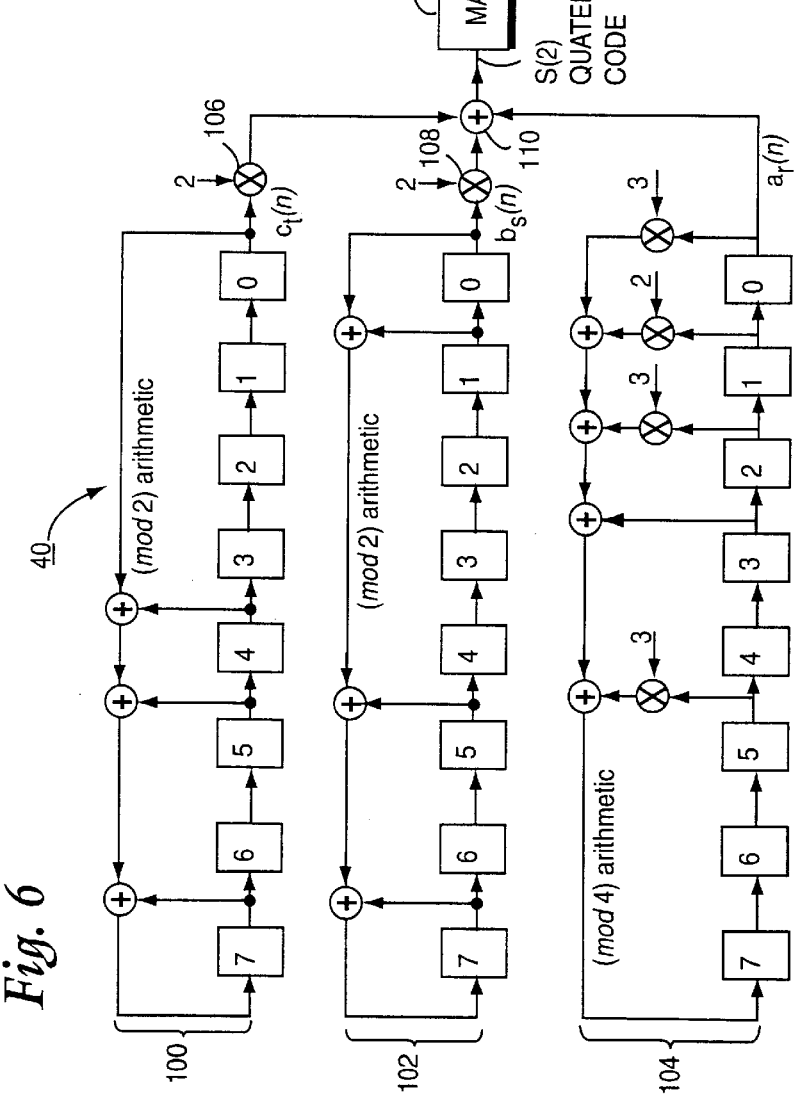
FIG. 6 is a schematic diagram illustrating in further detail the code generator shown in FIG. 2.

FIG. 6 illustrates an example shift register implementation of a code generator 40 for generating S(2) quadriphase spreading (and de-spreading) codes in accordance with one example embodiment of the present invention. Code generator 40 includes three linear, feedback shift registers 100, 102, and 104. Each shift register includes eight memory elements (shift stages) 0–7. At the beginning of each chip interval, the content of each memory element is moved (shifted) to the adjacent, right-hand memory element. The outputs of the memory elements are multiplied by the coefficients of the respective recurrence equation and then summed modulo 4 (or 2). The result of summation is stored in the left-most memory element at the beginning of the subsequent chip interval.

Shift register 104 implements the linear recurrence $a_r(n)$ defined in equation (1). Shift register 102 generates the $b_s(n)$ sequences, and shift register 100 generates the $c_t(n)$ sequences in accordance with equations (7) and (14). The outputs of shift registers 100 and 102 are multiplied by two in respective multipliers 106 and 108. Each of the three sequences output by the corresponding three shift registers is summed in summer 110 to generate an S(2) quaternary code which is converted to a corresponding S(2) quadriphase spreading code by way of mapper 112. Of course, the S(2) quaternary code output depends on the actual initial state set in the shift registers which are determined in accordance with equations (2), (3), (4), (11). Those initial states may be input into the appropriate shift registers by the transceiver controller 44, which sets the appropriate values of the adjustable parameters in the transmitter and receiver, both in the mobile and base station transceivers. Although in a preferred embodiment, the spreading code generator 40 is implemented using shift registers which generate the necessary S(2) spreading codes as needed, those S(2) spreading codes could be generated in advance, stored in memory, and retrieved using a table lookup function.

Thus, the present invention provides a family of quadriphase, CDMA spreading codes that provide a maximal number of CDMA spreading codes of a particular length having a minimal cross-correlation. At the same time, these spreading codes have a small signaling alphabet which is very convenient for the practical implementation of the spreader and the despreader.

Although the S(2) family of spreading codes may be allocated randomly, a preferred embodiment allocates codes from the S(2) family in a more advantageous fashion. As shown above, the S(1) and S(0) spreading code families are subsets of the S(2) code family and have better cross-correlation properties, and therefore produce less interference between mobile users. Table 1 above shows that the S(1) code family and the S(0) code family have one half and one fourth of the maximum absolute cross-correlation as the S(2) code family, respectively.

In this preferred embodiment, the large number of codes provided by the S(2) family is employed by the mobile communications system, but specific subsets of the S(2) codes are allocated to particular base stations or base station sectors. Consequently, depending on the number of mobile users in a particular area of a CDMA cellular network, service quality is improved, i.e., less interference between mobile users connected to the same base station or base station sector. For example, the mobile communications system may use S(2) spreading codes of length L=255. A first base station BS0 is allocated the subset of S(2) codes defined by the component sequences having indices r=0,1,2 . . . , 256; s=0; and t=0. In other words, BS0 is allotted the "pure" S(0) family of codes. A second neighboring base station BS1 is allocated another subset of S(2) spreading codes defined by the component sequences corresponding to indices r=0,1,2 . . . , 256; s=1; and t=0. The second base station codes are very similar to the pure S(0) codes, (the S(0) codes are multiplied chip-by-chip with a common component sequence $b_1(n)$), and have essentially the same characteristics. As a result of this S(2) code subset allocation, the cross-correlation between those allocated S(2) codes for each base station is the same as for the S(0) code family, i.e., less cross-correlation between codes as compared to that for the S(2) family in general.

Using such an S(2) subset code allocation strategy, mutual interference between mobile stations connected to the same base station is minimized, and the interference between the base stations is also bounded according to the properties of the S(2) codes. The S(2) subset code allocation strategy may be generally defined as follows: each BS (or BS sector) has at least L+2 spreading codes from the S(2) family defined by three component sequences having an index r=0,1,2 . . . , L+1 and indices s and t that are unique for each base station (or base station sector), i.e., the indices s and t have different integer values for different base stations.

While this subset code allocation scheme is advantageous in that it reduces cross-correlation between mobile users in a base station/sector as compared to the general S(2) code family, hand-over situations require some special provision. For the duration of a call, the mobile station keeps the same spreading code allocated at the beginning of the call by the source base station/sector even if the mobile changes from the original source base station during hand-over to a destination base station. Using the code allocated by the source base station while connected to the destination base station may produce interference greater than that for the S(0) family. But that interference is still no greater than that defined for the S(2) code set.

In the hand-over situation where the source base station allocated a particular spreading code to the mobile station, the source base station is prevented from allocating that same spreading code before the handed-over mobile station finishes the call to avoid the situation where two mobile stations are assigned the same code. One way of accomplishing this is for the source base station to assign a time-out flag to each available spreading code. The time-out flag is set, meaning that the code may be allocated to another mobile only if a predefined time interval has passed since the code was allocated. Alternatively, the flag has a non-zero time-out value only when the mobile is in handover with the time out interval commencing at the time of handover. Either way, the same code is prevented from being assigned to two mobile stations at the same time when the mobiles are connected to the neighboring base stations.

The construction of the S(2) or other family of spreading codes produces spreading codes that each have a length $L=2^m-1$. Consequently, each code's length is not a power of 2. However, in a CDMA system that supports different data rates over the same physical radio channel depending on which of different services is currently operating, the spreading code length should be expressed as a multiple of each spreading factor existing in the multi-rate CDMA system. The spreading factor is the number of chips (plural chips are used to spread one data bit) within the data symbol. One way of implementing multiple data rates is to use those data rates that permit the corresponding spreading factors (SF) to be expressed as $$SF(k)=L/2^k,$$

where the variable k is proportional to the data rate. Moreover, since the number of chips within the data symbol should be an integer, the spreading sequence length should be a power of 2.

Consequently, spreading code sequences belonging to the S(2) family should be extended with one quaternary symbol for optimal use in a multi-rate CDMA system. The present invention resolves this need by providing a spreading code extension without increasing the maximum cross-correlation between spreading codes in the spreading code family, with minimum hardware implementation complexity.

In a preferred embodiment that tries to reduce hardware implementation complexity, the spreading code symbol is added to the end of the original spreading code in order to extend the code by one symbol. Of course, the length of the original spreading code could be extended by adding a code symbol to other locations in the original code. In other words, extended spreading codes may be obtained by adding an additional spreading code symbol, after the L symbols of the original, non-extended spreading code of length $L=2^m-1$.

In one fixed code extension example embodiment, the additional spreading code symbol is fixed, i.e., the same for all spreading codes. In the case of quaternary codes like the S(2) family of spreading codes, the additional spreading code symbol can have four possible values. The particular code symbol value, i.e., chip value, may be chosen to minimize the mutual cross-correlation between extended sequences in a set i.e., the S(2) sequences.

Figure 7:
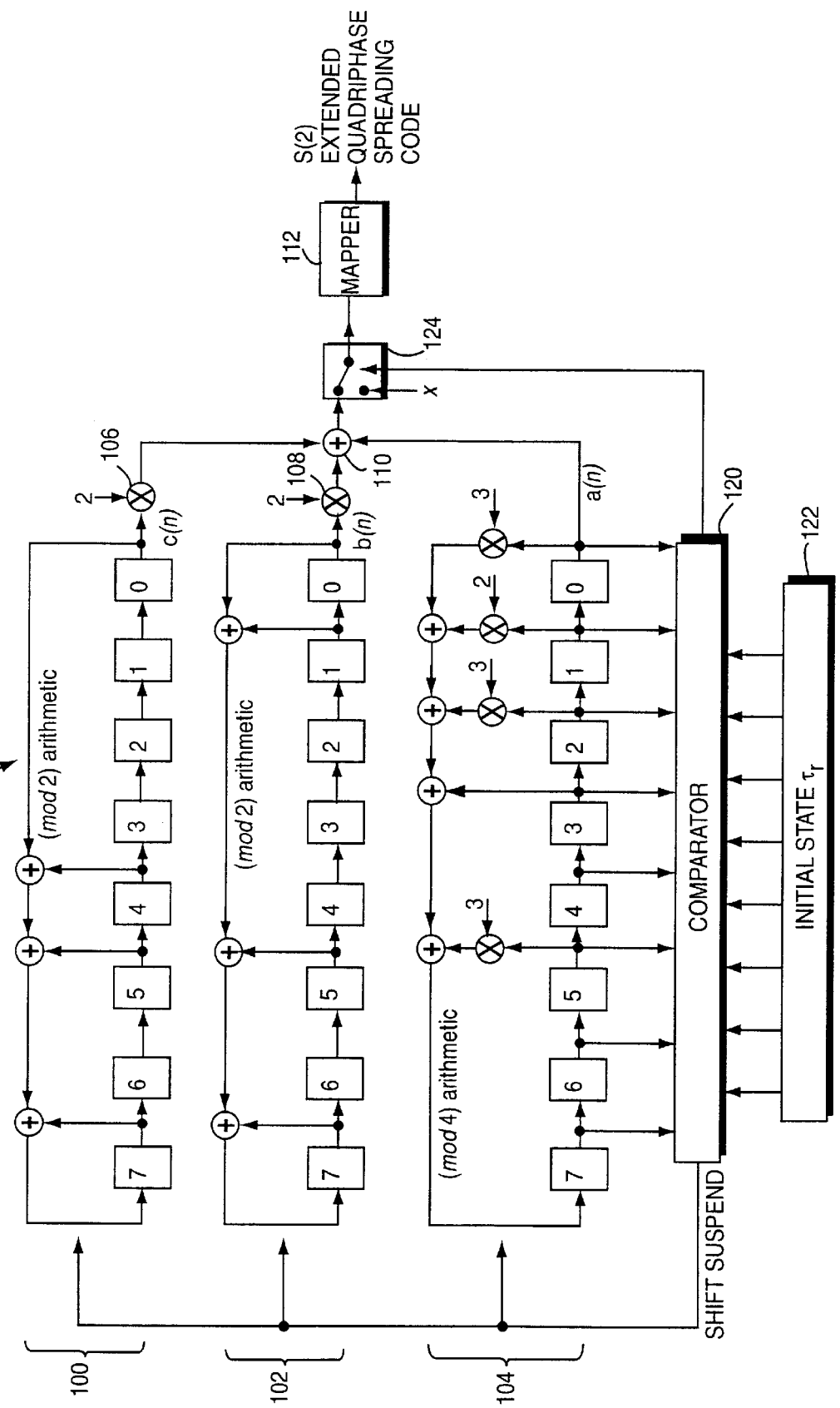
FIG. 7 is a schematic diagram illustrating an extended spreading code generator in accordance with a fixed extended symbol example embodiment.

An example of the fixed code extension embodiment is shown in FIG. 7 for original S(2) spreading codes of length 255 where like reference numbers refer to like elements from FIG. 6. The code generator 40' in FIG. 7 includes comparator 120 connected to the outputs of each memory element of the shift register 104 which generates the component sequence $a_r(n)$. In addition, a corresponding register 122 containing the initial state $\tau_r$ of the shift register 104 is connected to the remaining available inputs of the comparator 120. Still further, a switch block 124 is connected at one input terminal to the output of summer 110. The other input terminal is connected to the fixed code symbol value x, and the output of the switch is connected to mapper 112. Outputs from comparator 120 suspend the shifting operation of all three registers 100, 102, and 104 as well as control the state of the switch 110.

In operation, the comparator 120 detects the end of an original S(2) spreading code by detecting the end of component sequence $a_r(n)$. Only the component sequence $a_r(n)$ has the same period as the S(2) spreading code. The other two component sequences, $b_s(n)$ and $c_t(n)$, have shorter periods which are contained in the period of an S(2) spreading code, and therefore, they are not used to detect the end of S(2) spreading code. The end of component sequence $a_r(n)$ is detected by detecting the subsequent periodic occurrence of the same state of the shift register 104 which was loaded in register 104 at the initialization of the code generator 40 operation. During the initialization of the code generator 40, all three shift registers 100, 102, and 104 are loaded with the corresponding initial states and then released to run in parallel. However, only the internal state of the shift register 104 is monitored by the comparator 120.

When the end of the original spreading code is detected by the comparator 120, the comparator 120 generates a shift suspend operation during the next spreading code symbol cycle. At that time, the extension symbol x, which can be any one of the set of values 0, 1, 2, or 3, is added to the end of the code when the switch 124 is momentarily connected to the x terminal in accordance with an output from the comparator 120. During that time, the internal states of all three shift registers remain unchanged. As a result, the S(2) spreading code is extended by one symbol for a total of 256 symbols which is a power of 2, i.e., $2^8$=256. After inserted chip interval, three shift registers start shifting from the corresponding initial states without actual re-loading of those initial states.

Figure 8:
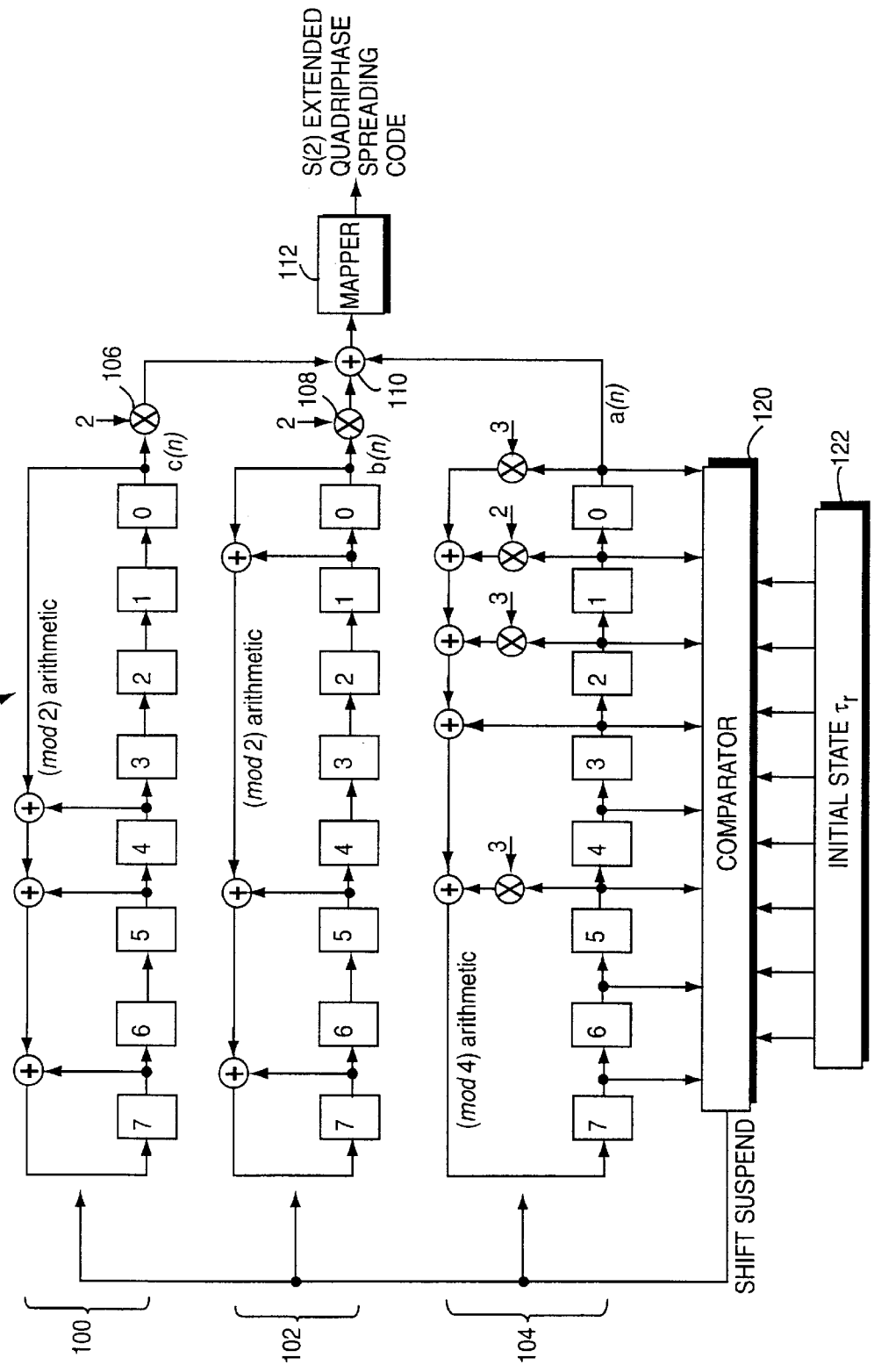
FIG. 8 is a schematic diagram illustrating an example extended spreading code generator in accordance with a periodic extended symbol example embodiment.
Figure 9:
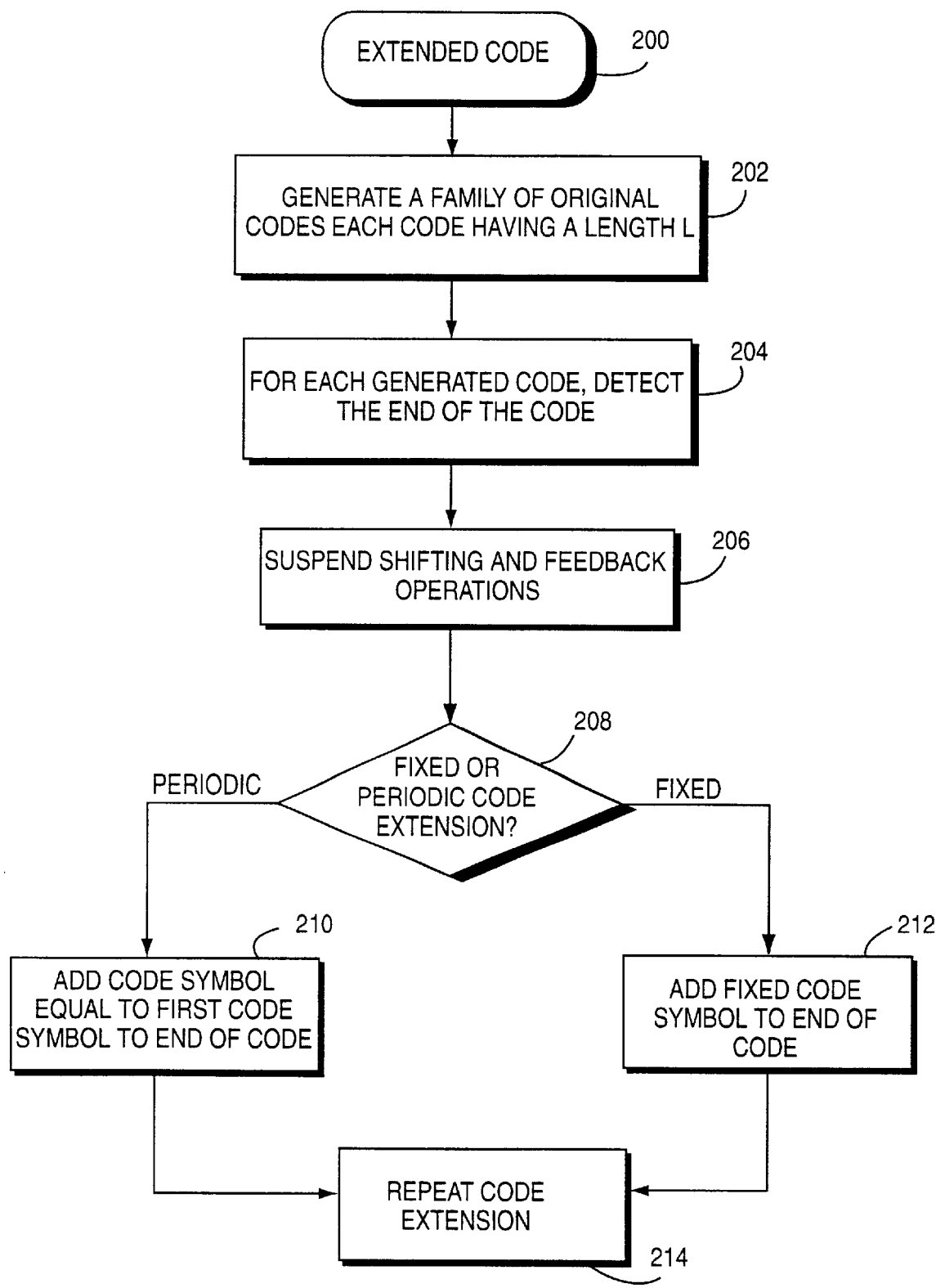
FIG. 9 is a function block diagram illustrating example procedures in accordance, with an extended spreading code embodiment of the present invention.

FIG. 8 shows an example of a periodic code extension embodiment in which the original spreading code is extended by a single chip whose value is the same as that of the first symbol in the original spreading code. The structure and operation of the code generator 40" shown in FIG. 8 is similar to that described above for the code generator 40' shown in FIG. 7. However, the switch 124 is not employed; nor is there any external source "x" that supplies the extra chip. Instead, when the end of the original spreading code is detected by the comparator 120, the corresponding output of the code generator 40 represents the extended (256-th) chip value. The shifting in all shift registers is suspended during the next chip cycle so the same state, equal to the initial state, appears in the first chip cycle of the next spreading code period. After the inserted chip interval, the three shift registers continue shifting from their corresponding initial states without actually re-loading those initial states.

Accordingly, an additional symbol code equal to the first symbol in the original spreading code is inserted after the last symbol in the original spreading code with no added hardware. This same periodic extension may be implemented using a modulo counter, modulo-256 in this example where L=255, (more generally the modulus of the counter is equal to the period of the extended spreading code), which indicates the end of extended spreading code. In operation, the shift registers are reinitialized as usual at the end of the code period and generate as the next chip output the first chip of the code as determined by the initial states of the shift registers. But after this first chip is output, (thereby extending the generated spreading code by one chip), the counter generates an output that causes the shift registers to re-load their respective initial states so that the extended code generation operation is again re-started.

Reference is now made to an extended code routine (block 200) which illustrates an example procedure in accordance with the present invention. Initially, a family of original spreading codes is generated, each code having a length L (block 202). For each generated spreading code, the end of that original spreading code is detected (block 204). Shifting and linear feedback operations in the code generator are momentarily suspended (block 206). A decision is made in block 208 whether the fixed spreading code extension procedure or the periodic spreading code extension procedure described in the two example embodiments immediately above is selected. For periodic spreading code extension, a spreading code symbol equal to the first symbol in that code is added to the end of the spreading code (block 210). For a fixed spreading code extension, a fixed code symbol is added to the end of the spreading code (block 212). The code extension process is repeated for each generated code (block 214). Of course, once the decision has been made as to the particular type of extension, the decision in block 208 no longer need be made.

For the S(2) family of spreading codes, both of the extension procedures described above can be performed easily and with minimal hardware. These extended S(2) codes provide the necessary flexibility to optimize multirate communications while permitting the largest number of users balanced with minimal cross-correlation between extended codes. Because the cross-correlation properties of extended codes is difficult to predict theoretically, the following performance evaluation of extended S(2) spreading codes is done numerically.

Figure 10:
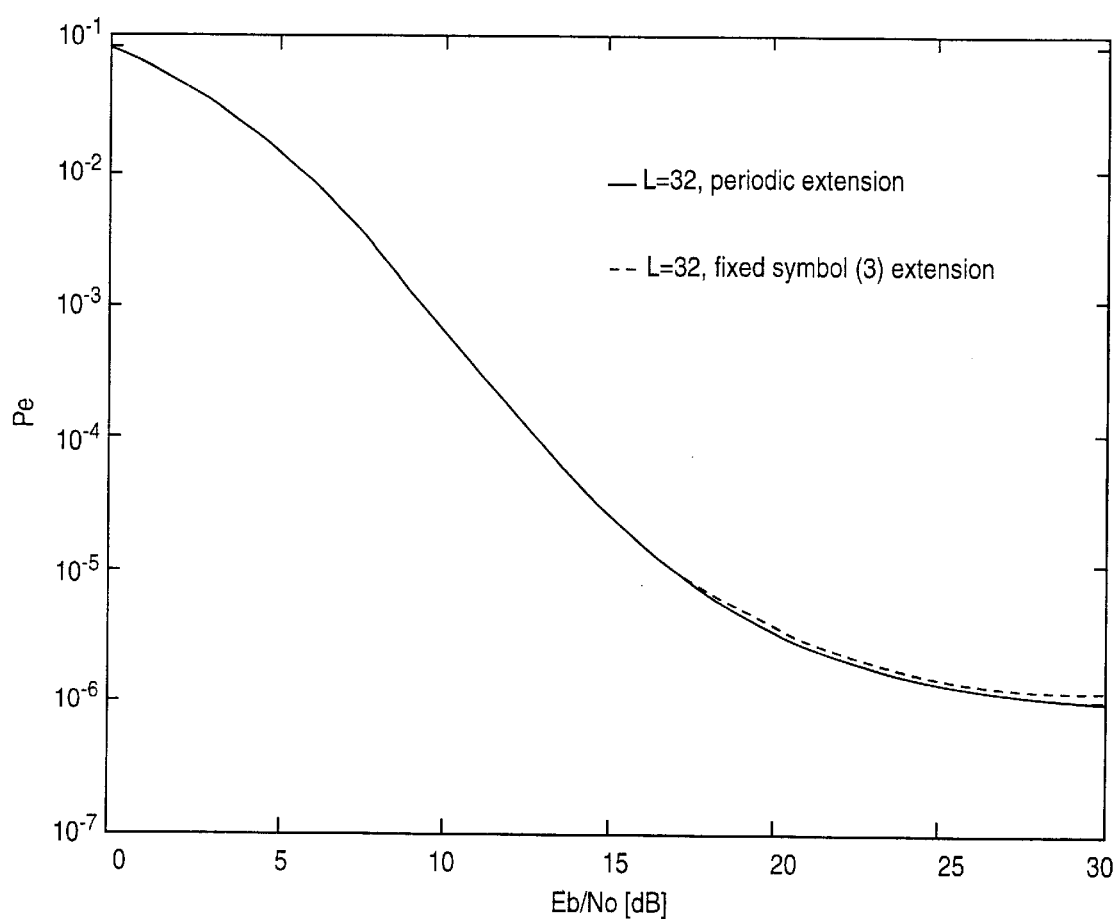
FIG. 10 is a graph illustrating a performance of the fixed and periodic extended spreading codes.

The performance of the fixed and periodic spreading code extensions is considered now in conjunction with FIG. 10 and is based on the calculation of the average bit error probability $P_e$ in a multiple access system with K concurrent users. The bit error probability calculation is implemented relying on a numerical evaluation of an analytical formula that includes (K−2)-fold convolution of the code-pair cross-correlation probability density function as follows:

$$P_e = \int_{-\infty}^{\infty} f_I(z) Q\left(\sqrt{\frac{2E_b}{N_o}}\left(1 - \frac{z}{E_b}\right)\right) dz. \tag{19}$$

where $$Q(z) = \frac{1}{\sqrt{2\pi}} \int_z^\infty e^{-t^2/2} dt,$$

$E_b$ is the data bit (spreading sequence) energy, $N_0$ is the additive white Gaussian noise power spectral density, and $f_I(z)$ is the multiple access interference probability density function (PDF). The function $f_I(z)$ is obtained by (K–2)-fold convolution of the code-pair cross-correlation PDF $f_{pair}(z')$, i.e., $$f_I(z) = \overline{f_{pair}(z') * f_{pair}(z')} \cdots * f_{pair}(z'). \tag{20}$$

A BPSK data modulation format and time shifts between users corresponding to the integer multiples of the code symbol (chip) period were assumed so that the cross-correlation probability density function can be presumed discrete. The cross-correlation probability density function was obtained by counting all the different values of the real part of even and odd cross-correlations within a given set of spreading codes. Cross-correlation probability density function was evaluated for the extended S(1) spreading codes (which form a subset of S(2) spreading codes) of length L=32.

It was found that both the fixed and periodic extension approaches have about the same performance. The average bit error probability $P_e$ for K=4 concurrent users using periodically extended S(1) sequences of length 32, as well as S(1) sequences extended by a fixed symbol (equal to 3) is shown in FIG. 10. Comparing performance between the non-extended and extended S(1) sequences, one would expect, based on the maximum absolute period cross-correlation ($C_{max}$), that the non-extended spreading codes should have better performance because they have a smaller $C_{max}$ value. If the number of users is K=4, the periodically extended spreading codes produce a slightly higher average bit error rate. However, when the number of users increases to K=6, the extended codes surprisingly produce a lower average bit error rate than non-extended spreading codes. This latter relationship remains valid for all other numbers of users greater than 6 which is another advantage of the extended spreading code embodiments of the present invention. The explanation may lie in the properties of the odd cross-correlation function, which dominantly influences the shape of the code-pair cross-correlation probability density function $f_{pair}(z')$, both for the non-extended and extended spreading codes. The shape of the multiple access interference probability density function $f_I(z)$, which directly determines the average bit error rate, is influenced both by the shape of the function $f_{pair}(z')$ and by the number of self-convolutions of $f_{pair}(z)$ in equation (20), i.e., by the number of concurrent users.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a direct sequence spread spectrum (DSSS) mobile communications system in which a plurality of mobile radio stations communicate with one or more radio base stations located in corresponding geographic areas over a radio channel, each radio channel corresponding to one of a set of spreading codes, one or more of the radio stations, comprising:

a spreading code generator configured to provide quaternary spreading codes from a family of quaternary sequences of length $L=2^m-1$, where m is an integer greater than or equal to 5, having code elements from an alphabet $\{0, 1, 2, 3\}$, generated by summing modulo-4 three component sequences including a first component quaternary sequence a, a second component binary sequence b, and a third component binary sequence c, where the component binary sequences b and c are multiplied by 2 before the modulo-4 summing;

a spreader configured to spread an information signal to be transmit by the mobile radio using one of the quaternary spreading codes to provide a spread signal; and a de-spreader configured to de-spread a received signal using one of the quaternary spreading codes.

2. The radio station in claim 1, further comprising:

a modulator configured to modulate the spread signal onto a radio carrier, and a demodulator configured to demodulate a received radio signal and providing the demodulated signal to the de-spreader.

3. The radio station in claim 1, wherein the family of quaternary spreading codes provides a maximal number of spreading codes of a particular length that have a minimal cross-correlation.

4. The radio station in claim 3, wherein the size of the family of quaternary spreading codes is $(L+2)(L+1)^2$ and the maximum absolute cross-correlation value for the family of quaternary spreading codes is $1+4\sqrt{(L+1)}$.

5. The radio station in claim 1, wherein the first component quaternary sequence is defined by:

$$a_r(n)=h_1 a(n-1)-h_2 a(n-2)- \ldots -h_m a(n-m)(\bmod 4), n \geq m,$$

where $h_1, h_2, \ldots, h_m$ are part of a first polynomial,
the second component quaternary sequence is defined by:

$$b_s(n)=g_1 b(n-1)+g_2 b(n-2)+ \ldots +b(n-e) \ (\bmod 2), n \geq e,$$

where $g_1$ and $g_2$ are part of a second polynomial,
the third component quaternary sequence is defined by:

$$c_t(n)=f_1 c_t(n-1)+f_2 c_t(n-2)+ \ldots +c_t(n-e)(\bmod 2), n \geq e,$$

where $f_1$ and $f_2$ are part of a third polynomial.

6. The radio station in claim 5, wherein the code generator includes first, second, and third feedback shift registers that are configured to generate the first, second, and third component quaternary sequences, respectively, and wherein the corresponding initial states of the first, second, and third shift registers are determined for each of the spreading codes in the family of quaternary spreading codes.

7. The radio station in claim 1, wherein the radio station is a mobile radio station and one of the base stations assigns one of the spreading codes to the mobile radio station in response to a request to a communication involving the mobile radio station.

8. The radio station in claim 1, wherein spreading code generator is configured to map the quaternary spreading code to a quadriphase spreading code.

9. The radio station in claim 1, wherein the code generator is configured to extend the length of the generated quaternary spreading codes.

10. The radio station in claim 9, wherein the generated quaternary spreading codes are extended by one quaternary symbol so that the quaternary spreading code length is a power of 2.

11. In a code division multiple access (CDMA) mobile communications system in which a plurality of mobile radio stations communicate with one or more radio base stations located in corresponding geographic areas over a radio channel, each radio channel corresponding to one of a set of spreading codes, one or more of the radio stations, comprising:

a code generator configured to provide quadriphase spreading codes determined from an S(2) set of quaternary spreading codes having a maximal number of quaternary spreading codes with a minimal cross-correlation and to extend a length of the S(2) quaternary spreading codes to support multi-rate communications in the CDMA mobile communications system;

a spreader configured to spread an information signal to be transmit by the radio station using one of the quadriphase spreading codes allocated to the radio station to provide a spread signal; and a modulator configured to modulate the spread signal onto a radio carrier.

12. The radio station in claim 11, further comprising:

a demodulator configured to demodulate a received CDMA signal from the radio carrier, and a de-spreader configured to de-spread the received CDMA signal using the one quadriphase spreading code to provide a received information signal.

13. The radio station in claim 11, wherein information signals to be transmit are allocated into a real data stream and an imaginary data stream, the radio station further comprising:

a real channel spreader configured to spread the real data stream using a real channelization code;

an imaginary channel spreader configured to spread the imaginary data stream using an imaginary channelization code; and a combiner configured to combine outputs from the real and imaginary channel spreaders to generate a complex signal, wherein the spreader is configured to spread the complex signal using the one quadriphase spreading code allocated to the mobile radio.

14. The radio station in claim 13, wherein the modulator is a quadrature phase shift keying (QPSK) modulator and wherein the complex signal is split into real and imaginary components which are then input to real and imaginary inputs of the QPSK modulator.

15. The radio station in claim 14, wherein the code generator is configured to map the quaternary spreading code to a quadriphase spreading code.

16. The radio in claim 11, wherein the code generator is configured to extend the length of the S(2) quaternary spreading codes periodically.

17. The radio station in claim 11, wherein the S(2) quaternary spreading codes are extended by one quaternary symbol so that the S(2) quaternary spreading code length is a multiple of each of multiple spreading factors used in the CDMA mobile communications system.

18. In a code division multiple access (CDMA) communications system in which a plurality of communications devices communicate using allocated communications channels, each channel corresponding to one of a set of CDMA spreading codes, a method comprising:

generating a family of original codes, each original code having a predetermined length, and extending the length of original codes from the family of spreading codes by a code symbol to generate a family of CDMA spreading codes by detecting the end of one of the original codes, and adding the code symbol to the end of one of the original codes.

19. The method in claim 18, wherein the code symbol is the same for all of the original codes in the family.

20. The method of claim 18, wherein the code symbol is the same as a first code symbol in the one original code.

21. In a code division multiple access (CDMA) communications system in which a plurality of communications devices communicate using allocated communications channels, each channel corresponding to one of a set of CDMA spreading codes, a method comprising:

generating a family of original codes, each original code having a predetermined length, and extending the length of original codes from the family of spreading codes by a code symbol to generate a family of CDMA spreading codes by detecting the end of one of the original codes, and adding the code symbol to the end of one of the original codes, wherein the family of original codes has a length of $L=2^m-1$, where m is an integer, and a single code symbol is added to the end of the original code periodically.

22. The method in claim 18, wherein the family of original codes are quadriphase codes, and the code symbol used to extend the original code has four possible values.

23. In a code division multiple access (CDMA) communications system in which a plurality of communications devices communicate using allocated communications channels, each channel corresponding to one of a set of CDMA spreading codes, a method comprising:

generating a family of original codes, each original code having a predetermined length, and extending the length of original codes from the family of spreading codes by a code symbol to generate a family of CDMA spreading codes by detecting the end of one of the original codes, and adding the code symbol to the end of one of the original codes, wherein the family of original codes are an S(2) family of codes and the code symbol is selected to minimize cross-correlation between CDMA spreading codes.

24. A CDMA code generator providing CDMA spreading codes, comprising:

one or more feedback shift registers having m stages, where m is an integer, where an output of a last stage is fed back to an input of a first stage, the output of the one or more feedback shift registers corresponding to one of a family of codes, and electronic circuitry for adding an additional code symbol to the one code to provide an extended code corresponding to one of the CDMA spreading codes.

25. The CDMA code generator in claim 24, further comprising:

a comparator for detecting an end of the one code and signaling the electronic circuitry to add to the additional code symbol to the end of the one code.

26. The CDMA code generator in claim 24, further comprising:
a counter for generating a counter output at the end of an extended code period which causes the shift registers to be set respective initial states.

27. The CDMA code generator in claim 24, wherein the added code symbol is the same for all of the codes in the family.

28. The CDMA code generator in claim 24, wherein the added code symbol is the same as the first code symbol in the one original code.

29. The CDMA code generator in claim 26, wherein the family of original codes has a length $L=2^m-1$, where m is a positive integer, and a single code symbol added to the end of one of the original codes is selected to reduce cross-correlation between the CDMA spreading codes.

30. The CDMA code generator in claim 24, wherein the family of codes correspond to a family of quaternary sequences of length $L=2^m-1$, where m is an integer greater than or equal to 5, having code elements from an alphabet {0, 1, 2, 3}, generated by summing modulo-4 three component sequences including a first component quaternary sequence a, a second component binary sequence b, and a third component binary sequence c, wherein the one or more feedback shift registers includes first, second, and third feedback shift registers that generate the first, second, and third component quaternary sequences, respectively, with the output of the second and third shift registers being multiplied by 2 before the first, second, and third component quaternary sequences are modulo-4 summed.

31. The CDMA code generator in claim 30, wherein the code generator is configured to map the extended quaternary sequence to complex quadriphase CDMA spreading codes.

32. In a mobile communications system including plural base stations for communicating with mobile stations and employing spreading codes from a particular spreading code family for radio communications between the mobile stations and the base stations, a method comprising:
allocating a first subset of the particular spreading code family to a first base station, and
allocating a second subset of the particular spreading code family to a second base station,
wherein the spreading codes in the first and second subsets have lower cross-correlation than spreading codes in the particular spreading code family.

33. The method in claim 32, wherein the particular spreading code family corresponds to an S(2) code family and the first and second subsets are associated with one or both of an S(0) code family and an S(1) code family.

34. The method in claim 33, wherein each of the first and second spreading code subsets is defined by three component sequences such that a first component sequence includes an index of r=0, 1, 2 . . . , L+1, where L is the spreading code length, and one or more of indices for the second and third component sequences are different for the first and second base stations.

35. The method in claim 32, further comprising:
for a particular call, assigning a mobile station associated with the first base station an assigned code from the first subset of spreading codes;
associating a flag with the assigned code;
setting the flag to a first value when the mobile station is involved in the call;
setting the flag to a second value after a prescribed time expires; and
prohibiting assignment of the assigned code to another mobile station until after the prescribed time expires.

36. The method in claim 35, further comprising:
setting the flag to the first value at the beginning of the call, and
measuring the prescribed time from the beginning of the call.

37. The method in claim 35, wherein the mobile station employs the assigned code for the duration of the call even when the call is handedover to the second base station.

38. The method in claim 37, further comprising:
setting the flag to the first value when the mobile is involved in the call;
measuring the prescribed time from a time associated with the handover; and
if the mobile station has not been in a handover during the call, the flag is set to the second value at the end of call.

39. In a mobile communications system including base station having plural sectors for communicating with mobile stations and employing spreading codes from a particular spreading code family for radio communications between the mobile stations and the base station, a method comprising:
allocating a first subset of the particular spreading code family to a first base station sector, and
allocating a second subset of the particular spreading code family to a second base station sector,
wherein the spreading codes in the first and second subsets have lower cross-correlation than spreading codes in the particular spreading code family.

40. The method in claim 39, wherein the particular spreading code family corresponds to an S(2) code family and the first and second subsets are associated with one or both of an S(0) code family and an S(1) code family.

41. The method in claim 40, wherein each of the first and second spreading code subsets is defined by three component sequences such that a first component sequence includes an index of r=0, 1, 2 . . . , L+1, where L is the spreading code length, and one or more of indices for the second and third component sequences are different for the first and second base station sectors.

42. The method in claim 39, further comprising:
for a particular call, assigning a mobile station associated with the first base station sector an assigned code from the first subset of spreading codes;
associating a flag with the assigned code;
setting the flag to a first value when the mobile station is involved in the call;
setting the flag to a second value after a prescribed time expires; and
prohibiting assignment of the assigned code to another mobile station until after the prescribed time expires.

43. The method in claim 42, further comprising:
setting the flag to the first value at the beginning of the call, and
measuring the prescribed time from the beginning of the call.

44. The method in claim 42, wherein the mobile station employs the assigned code for the duration of the call even when the call is handedover to the second base station sector.

45. The method in claim 44, further comprising:
setting the flag to the first value when the mobile station is involved in the call;

measuring the prescribed time from a time associated with the handover; and if the mobile station has not been in a handover during the call, the flag is set to the second value at the end of call.

46. The method in claim 18, wherein the length of the original codes are extended without having to increase the number of the original codes from the family.

47. In a code division multiple access (CDMA) communications system in which a plurality of communications devices communicate using allocated communications channels, each channel corresponding to one of a set of CDMA spreading codes, a method comprising:

generating a family of original S(2) quaternary spreading codes, each original code having a predetermined length, and extending the length of original codes from the family of original S(2) quaternary spreading codes by a code symbol to generate a family of CDMA spreading codes without having to increase the number of the original codes from the family.

48. The method in claim 47, wherein the extending further comprises:

detecting the end of one of the original codes, and adding the code symbol to the end of one of the original codes.

49. The method in claim 47, wherein the code symbol is the same for all of the original codes in the family.

50. The method in claim 47, wherein the code symbol is the same as the first code symbol in the one original code.

51. The method in claim 47, wherein the code symbol is added to the end of one of the original codes periodically.

52. The method in claim 47, wherein the family of original codes are quadriphase codes, and the code symbol used to extend the original code has four possible values.

53. The method in claim 47, wherein the code symbol is selected to minimize cross-correlation between CDMA spreading codes.

54. A CDMA code generator providing CDMA spreading codes, comprising:

one or more feedback shift registers having m stages, where m is an integer, where an output of a last stage is fed back to an input of a first stage, the output of the one or more feedback shift registers corresponding to one of a family of S(2) quaternary spreading codes of length $L=2^m-1$, and electronic circuitry for adding an additional code symbol to the one S(2) quaternary spreading code to provide an extended S(2) quaternary spreading code corresponding to one of the CDMA spreading codes.

55. The CDMA code generator in claim 54, further comprising:

a comparator for detecting an end of the one S(2) quaternary spreading code and signaling the electronic circuitry to add to the additional code symbol to the end of the one S(2) quaternary spreading code.

56. The CDMA code generator in claim 54, further comprising:

a counter for generating a counter output at the end of an extended code period which causes the shift registers to be set respective initial states.

57. The CDMA code generator in claim 54, wherein the added code symbol is the same for all of the codes in the family.

58. The CDMA code generator in claim 54, wherein the added code symbol is the same as the first code symbol in the one original code.

59. The CDMA code generator in claim 54, wherein a value of the additional code symbol is selected to reduce cross-correlation between the CDMA spreading codes.

\* \* \* \* \*